(No Model.)
D. M. MILLER.
FIELD OR LAWN MOWER.
No. 495,825. Patented Apr. 18, 1893.
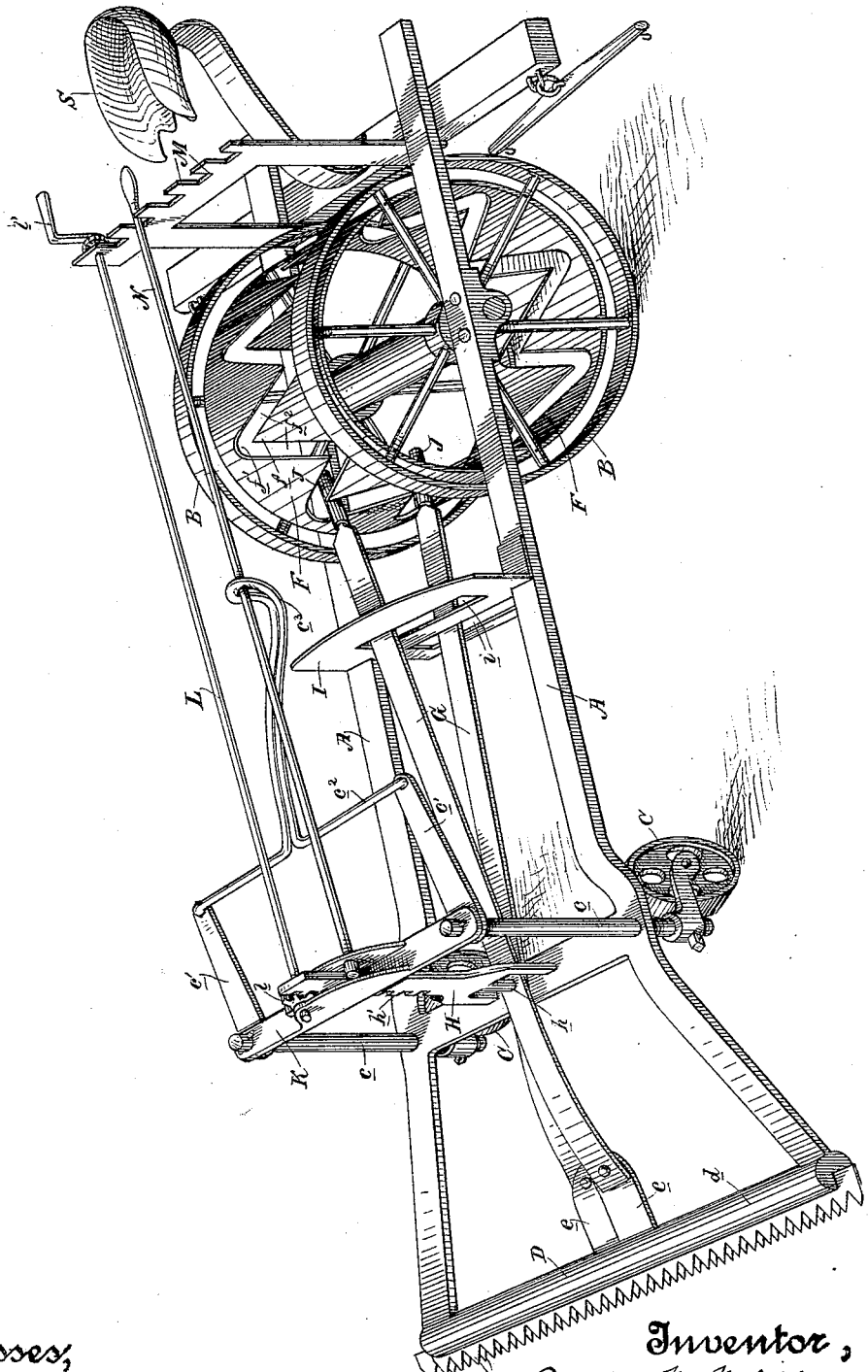
Witnesses,
Inventor,
David M. Miller
By Dewey & Co
attys

UNITED STATES PATENT OFFICE.

DAVID M. MILLER, OF FAIRFIELD, CALIFORNIA.

FIELD OR LAWN MOWER.

SPECIFICATION forming part of Letters Patent No. 495,825, dated April 18, 1893.

Application filed July 21, 1892. Serial No. 440,812. (No model.)

*To all whom it may concern:*

Be it known that I, DAVID M. MILLER, a citizen of the United States, residing at Fairfield, Solano county, State of California, have invented an Improvement in Field and Lawn Mowers; and I hereby declare the following to be a full, clear, and exact description of the same.

My invention relates to that class of mowers in which the motion of the sickle is derived by power transmitted from what is known as a scroll wheel; and it consists in the novel construction, arrangement and combination of parts hereinafter fully described and specifically set forth in the claims.

The object of my invention is to provide a simple and effective mower for either field or lawn work having greater power, rapid in operation, and capable of being quickly and easily adjusted and guided.

Referring to the accompanying drawing for a more complete explanation of my invention,—the figure is a perspective view of my mower.

A is the frame of the machine, mounted at its rear portion upon the two main traction wheels B, and at its front end upon the swivel wheels C, said frame being vertically movable upon the spindles $c$ of the swivel wheels. At the front of the frame is the sickle guide bar D in which is mounted and adapted to reciprocate the two sickles E, one above the other and lying directly in contact whereby their teeth, moving in opposite directions, will cross each other and cut the material between them. These sickles derive their movement from the following mechanism: Secured to the inner side of each main or traction wheel B is an annular flange F. Each of these flanges is formed with a series of triangular points $f$ and intervening triangular recesses $f'$. The points of one flange are opposite the recesses of the other flange and their edges do not come together whereby a symmetrically tortuous passage $f^2$ is formed between the two flanges, said passage having straight walls, the bottoms of the recesses, however, being slightly curved as shown. These flanges, it will be observed, are located well within the peripheries of the traction wheels, that is to say, they are smaller in diameter than said wheels, whereby they are fully protected from any contact with the ground, and the passage formed by them is not liable to become clogged or obstructed by any loose material over which the machine is passing. This passage is, therefore, always free and the flanges composing it are not likely to be injured in any manner.

G G are the vibrating levers for operating the sickles. These are connected, each with one of the sickles, by means of backwardly extending arms $e$ from said sickles which pass through an elongated slot $d$ in the guide bar. The levers are each pivoted upon a vertical pin $h$ in a standard H of the frame, and their rear ends are separately guided in independent slots $i$ in a fixed guide plate I extending between the sides of the frame. These rear ends are provided with anti-friction rollers J, and enter the tortuous passage at different points, one above the other, and they lie in this passage upon oppositely inclined adjacent planes. Now, when the machine is advanced, the tortuous passage in which the rear ends of the levers are confined, cause said ends to travel in opposite directions, thereby transmitting their movement to the sickles. The straight sides or planes of this passage prevent any cramping or binding of these ends of the levers, so that they slip smoothly and easily as the wheels rotate. Being separately guided and held by the plate I they maintain their relative positions, so that they are always at the proper distance apart to effect their opposite movements.

The standard H of the frame is provided with rack teeth $h'$, and its upper end is guided through a cross-bar K in which the tops of the swivel wheel spindles $c$ are journaled. In this cross-bar is journaled the forward end of a shaft L which carries a pinion $l$ engaging with the rack teeth $h'$ of the standard. The rear end of the shaft is journaled in one end of a rack bar M at the back of the machine, and is provided with a crank $l'$ by which it may be turned. This crank is within convenient reach of the driver occupying the seat S, and by turning it the standard H will be lifted, thereby raising the forward end of the machine and thus regulating the vertical position of the sickles. In this movement the front portion of the frame slips upwardly on the swivel wheel spindles $c$ and its rear portion turns about main wheels B as centers.

The swivel wheel spindles $c$ have crank arms $c'$ joined by a cross-bar $c^2$ which has a backwardly extending arm $c^3$.

N is a lever rod mounted pivotally at its forward end in the cross-bar K and connected with the arm $c^3$ of the cross-bar $c^2$, its rear end being within reach of the driver and adapted to be engaged by the rack bar M. By moving this lever the spindles of the swivel wheel C will be turned whereby the machine can be readily guided.

Having thus described my invention, what I claim as new, and desire to secure by Letters Patent, is—

1. In a mower, the sickle carrying frame mounted at its rear portion upon main wheels and at its forward portion upon the spindles of front wheels and adapted to be moved up and down upon said spindles, in combination with the rack standard of said frame, the cross-bar carried by the front wheel spindles, the crank rod mounted in said cross-bar, and the pinion of said rod engaging the rack standard whereby the forward end of the frame is vertically adjusted, substantially as herein described.

2. A mower consisting of the frame having the oppositely reciprocating sickles at its forward end, the front wheels with spindles on which the frame is adapted to move vertically, the main traction wheels at the rear end of the frame having the annular concentric flanges of smaller diameter secured to their inner surfaces, said flanges having the opposing triangular points and recesses forming between them the tortuous passage, the oppositely vibrating levers having their forward ends connected with the sickles and their rear ends engaging the tortuous passage on opposite planes, the slotted guide plate in which the rear ends of said levers play, the standard H of the frame having the pin in its lower portion on which the vibrating levers are pivoted and the rack teeth at its upper end, the cross bar carried by the front wheel spindles, the crank rod mounted in said cross bar and the pinion of said rod engaging the rack teeth of the standard H, substantially as herein described.

In witness whereof I have hereunto set my hand.

DAVID M. MILLER.

Witnesses:
M. L. FITCH,
JOHN MARSHALL.